United States Patent [19]

Lunz et al.

[11] Patent Number: 5,096,658
[45] Date of Patent: Mar. 17, 1992

[54] DETECTOR PATH INSERTION VERIFICATION SYSTEM

[75] Inventors: Kenneth G. Lunz, Pittsburgh; Kevin P. Litzinger, Level Green, both of Pa.

[73] Assignee: Westinghouse Electric Corp., Pittsburgh, Pa.

[21] Appl. No.: 494,414

[22] Filed: Mar. 16, 1990

[51] Int. Cl.$^5$ ............................................. G21C 17/00
[52] U.S. Cl. .................................. 376/258; 376/254; 376/245
[58] Field of Search ................ 376/245, 258, 254, 255

[56] References Cited

U.S. PATENT DOCUMENTS

| | | | |
|---|---|---|---|
| 3,766,005 | 10/1973 | Erkens | 176/19 R |
| 3,932,211 | 1/1976 | Loving, Jr. | 176/19 R |
| 4,030,527 | 6/1977 | Roch | 140/92.1 |
| 4,255,234 | 3/1981 | Neuner et al. | 176/19 R |
| 4,268,354 | 5/1981 | Wassel et al. | 176/19 EC |

OTHER PUBLICATIONS

Brochure for "Digital Flux Mapping System" from Westinghouse Nuclear Services Integration Division.
Wassel et al., "A Microprocessor Based Automatic Flux Mapping System for Pressurized Water Reactors", IEEE Transactions on Nuclear Science, vol. NS-26, No. 1, Feb. 1979.
Vriese, A., "De 54 MWe kernenergiecentrale te Dodewaard", *Polytechnisch Tijdschrift Elektrotechniek Elektronica*, vol. 22, Sept. 13, 1968, pp. 671-674.
European Search Report, The Hauge, 06-28-1991.

*Primary Examiner*—Brooks H. Hunt
*Assistant Examiner*—Chrisman D. Carroll

[57] ABSTRACT

A detector path insertion verification system for use with flux mapping of a pressurized water nuclear reactor uses a transfer insertion switch at the input of each multiple-path selector to detect insertion of a detector into the multiple-path selector. No insertion switches are used at the output of the multiple-path selectors; instead software is used to verify the position of the multiple-path selectors. The sensed actual position of each multiple-path selector is monitored as the multiple-path selector is rotated to verify that the sensed actual position passes through the expected sequence of positions in an expected amount of time. The multiple-path selectors are rotated until a sensed actual position is equal to a desired position and rotation is stopped. After the passage of a short period of time, the actual and desired positions are again compared and if equal, insertion is begun. When the transfer insertion switch detects insertion of the detector into the multiple-path selector, the actual and desired positions are again checked and insertion of the detector is continued only if the actual and desired positions are still equal.

11 Claims, 6 Drawing Sheets 5,096,658

DETECTOR PATH INSERTION VERIFICATION SYSTEM

BACKGROUND OF THE INVENTION

1. Field of the Invention

The present invention relates to flux mapping systems for nuclear reactors and, more particularly, to verifying insertion of detectors into a desired thimble in a flux mapping system.

2. Description of the Related Art

Nuclear reactors include incore and excore detectors, i.e., detectors which are positioned inside the nuclear reactor core and detectors which are outside the core but inside the containment. Flux detectors, for example, may be used both inside the core and outside the core. In both cases, the flux detectors measure neutron flux emanating from the fuel in the core. The incore flux detectors are inserted into thimbles which pass through the core. The incore flux detectors are then drawn out of the core at a predetermined rate to produce a flux map along each thimble.

A pressurized water nuclear reactor typically has approximately sixty thimbles, but may have only four detectors. Multiple-path selectors are used to route the detectors into the thimbles. All or a portion, e.g., a quadrant, of the core may be mapped at a given time. Typically, all, e.g., four detectors are inserted into different thimbles simultaneously so that the map can be produced as quickly as possible while conditions in the core undergo little change.

To produce an accurate core map, it is necessary to determine into which thimbles the detectors are inserted. This is termed path insertion verification. It is not uncommon for mechanical malfunctions of path insertion verification switches to reduce the availability of flux mapping systems. Flux maps are typically produced once a month to determine the decay rate of fuel in the reactor. The path verification switches in a conventional system are located in containment; thus, repair of a malfunctioning switch exposes maintenance workers to undesirable levels of radioactivity. In addition, flux mapping system availability has been reduced while waiting for a plant shutdown, e.g., for refueling, to repair the path verification switches. Also, low reliability of the path insertion switches has reduced availability of flux mapping systems by requiring all detectors to be fully withdrawn prior to starting a flux map.

SUMMARY OF THE INVENTION

An object the present invention is to provide a flux mapping system with improved reliability.

Another object of the present invention is to provide path verification in a flux mapping system that requires fewer low reliability switches.

A further object of the present invention is to reduce the need to expose maintenance workers to undesirable levels of radiation without reducing availability of a flux mapping system.

Yet another object of the present invention is to provide a path verification system using software and information regarding multiple-path selector position to detect common malfunctions of the multiple-path selectors used in a flux mapping system.

The above objects are attained by providing a method for verifying position of a cable passing through a multiple-path selector, comprising the steps of: controlling movement of the multiple-path selector to a desired position; verifying that the multiple-path selector is stopped at the desired position; controlling insertion of the cable through the multiple-path selector after verifying that the multiple-path selector is stopped; and detecting insertion of the cable into the multiple-path selector. Sensor readings of an actual position of the multiple-path selector are compared with the desired position and the multiple-path selector is rotated until the actual and desired positions are equal. The multiple-path selector position is detected again a short period of time after the selector is stopped to verify that the selector did not continue to rotate after being instructed to stop. A transfer insertion switch at the input of the multiple-path selector senses when the detector is inserted into the multiple-path selector.

The position of the multiple-path selector is preferably detected by cams in a geneva selector mechanism which produce Grey code signals, e.g., the four-bit binary grey code signal which corresponds to the decimal numerals 0, 1, 3, 2, 6, 7, 5, 4, 12, 13, 15, 14, 10, 11 and 9 for a fifteen-path selector. The Grey code signals are used to verify that the multiple-path selector passes through each position as it is rotated.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENT

Figure 1:
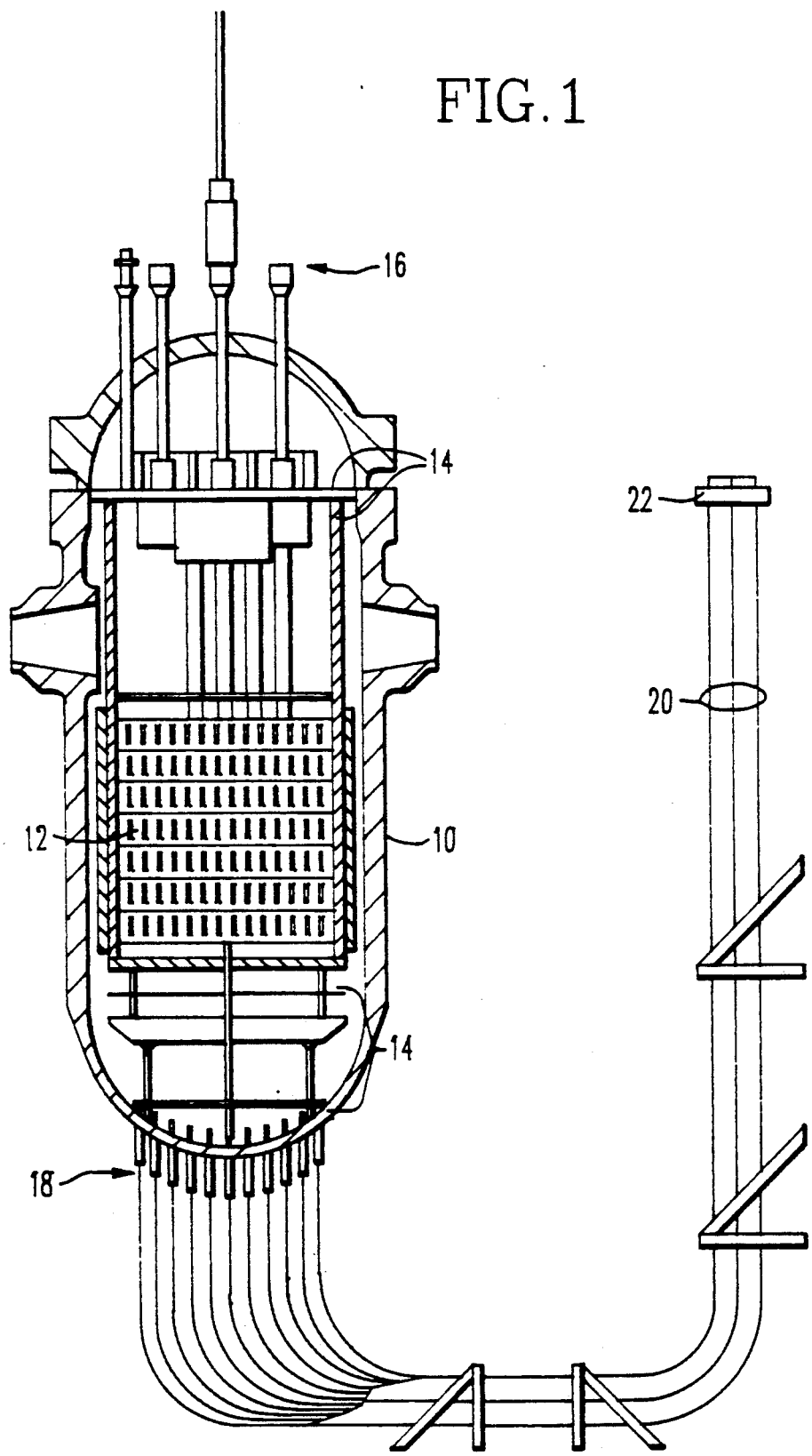
FIG. 1 is a schematic diagram of a nuclear reactor including an illustration of thimble guides.

As illustrated in FIG. 1, a nuclear reactor vessel 10 contains a fuel assembly 12 and support structures 14. Various instrumentation and drive devices 16 penetrate the vessel 10 from above. Thimble guide tubes 18 penetrate the vessel 10 from below. The detector cables 20 run from a seal table 22 to the thimble guide tubes 18 when mapping the core 12 of the reactor.

Figure 2B:
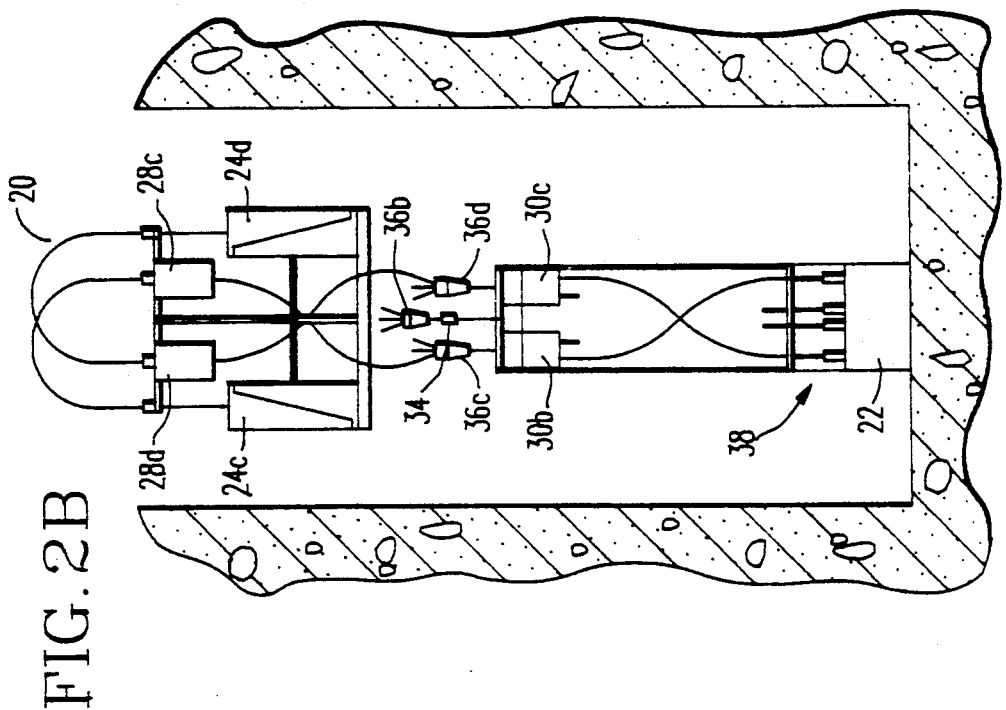
FIGS. 2A and 2B are front and side views of a drive system for a flux mapping system.
Figure 2A:
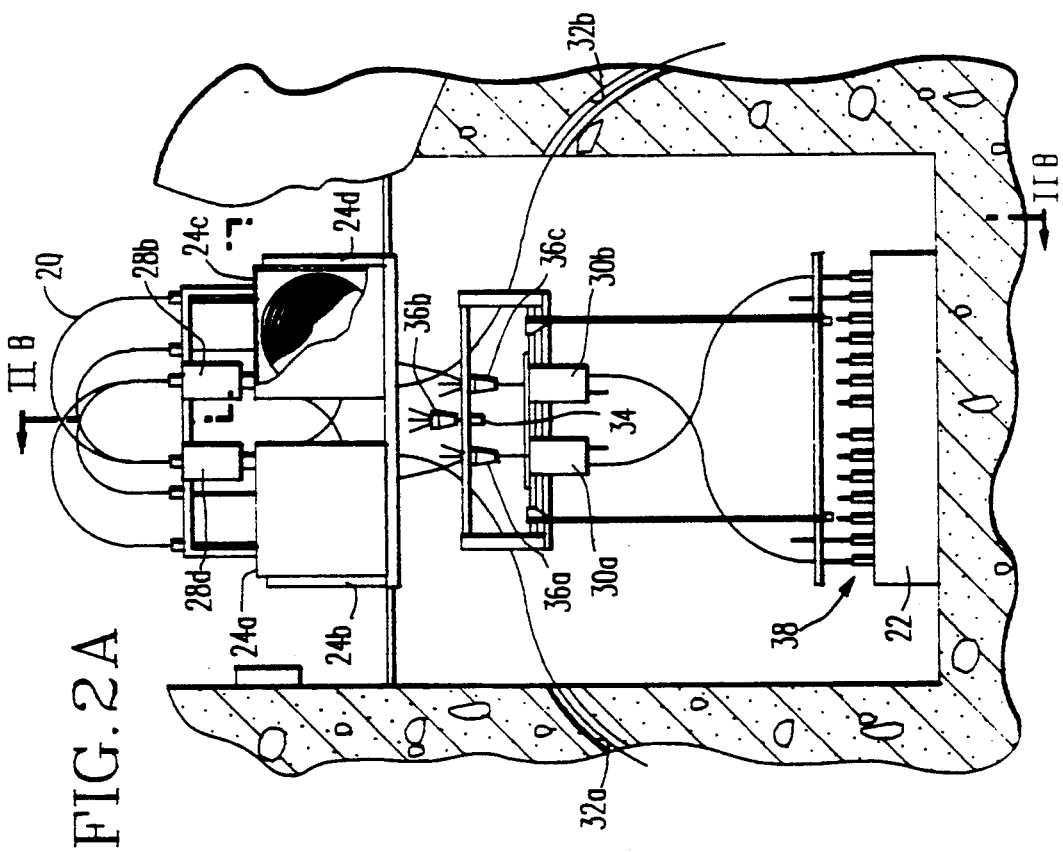

As illustrated in FIG. 2A, four detector drivers 24a–24d drive detector cables 20 into four corresponding six-path selectors 28b–28d (selector 28a corresponding to driver 24a is not illustrated in FIG. 2A or FIG. 2B). Each six-path selector 28 selects one of four fifteen-path selectors 30a–30c (the fourth fifteen-path selector is not visible in either FIG. 2A or FIG. 2B), or one of four detector storage conduits of which two, 32a and 32b are illustrated in FIG. 2A, or a calibration path switch 34. The detector storage conduits 32 each correspond to one of the detector drivers 24. However, each of the fifteen-path selectors 30 and the calibration path switch 34 can receive detectors from any of the four detector drivers 24 via the six-path selectors 28 and wyes 36a–36d (the fifth wye is not visible in either of FIGS. 2A and 2B).

Each fifteen-path selector 30 can select one of up to fifteen thimble guide tubes 38. Thus, up to 60 thimbles can be accessed by each detector driver 24 in the flux drive system arrangement illustrated in FIGS. 2A and 2B. Other arrangements are also possible using, e.g., ten-path selectors to access a larger or smaller number of thimbles. Although the thimble guide tubes 38 are illustrated as ending a short distance above the seal table 22, they all extend to the fifteen-path selectors 30, but only two thimble guide tubes are illustrated in FIGS. 2A and 2B to simplify visualization of the connections between the selectors 30 and the seal table 22.

Figure 3A:
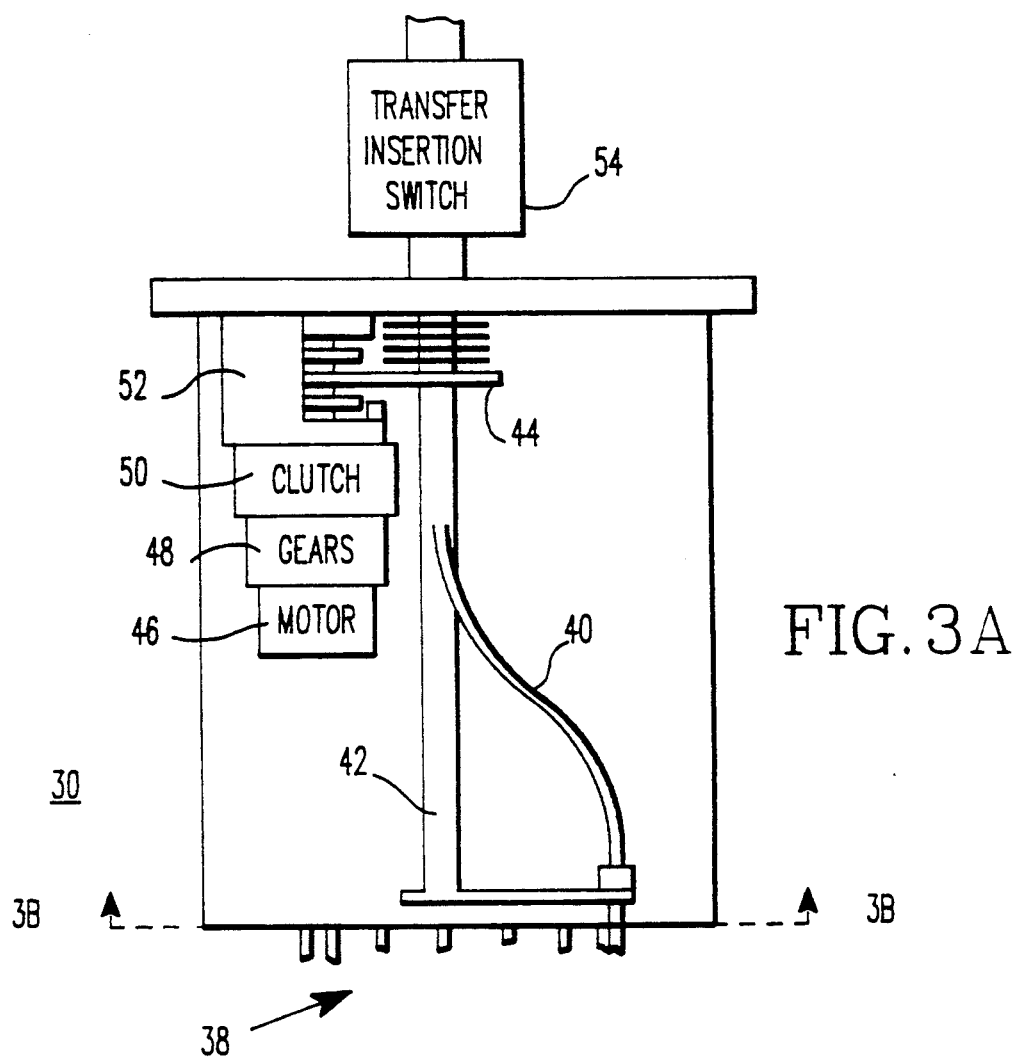
FIGS. 3A and 3B are side and bottom views of a fifteen-path selector.
Figure 3B:
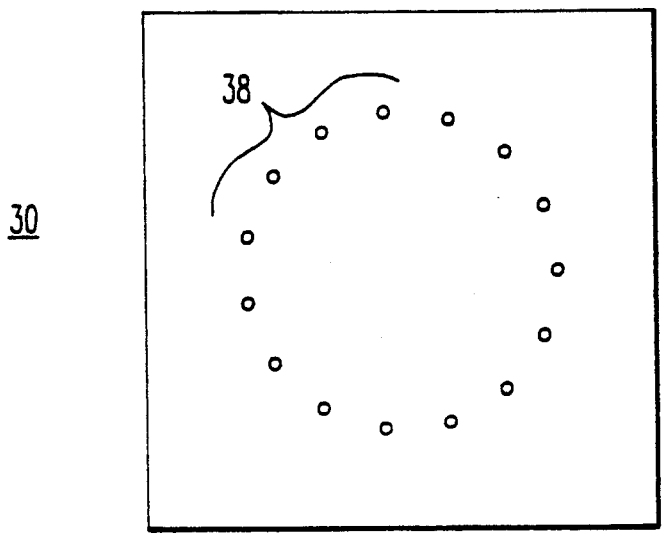

One of the fifteen-path selectors 30 is illustrated in FIGS. 3A and 3B. As illustrated in FIG. 3B, the ends of the thimble guide tubes 38 are disposed equally spaced around a circle. If FIGS. 3A and 3B illustrated a twelve-path selector, the thimble guide tubes illustrated in FIG. 3B would be arranged in the positions of the numbers on a twelve hour clock. The thimble guide tubes 38 receive the detector cable via a detector distributor tube 40 attached to a shaft 42. The shaft 42 is driven by a drive gear 44. The drive gear 44 is powered by an electric motor 46 which is connected to the drive gear 44 by gears 48, clutch 50 and geneva selector mechanism 52. The geneva selector mechanism 52 includes position detent cams and toggle switches which generate Grey code signals of the position of the shaft 42 and thereby the detector distributor 40. A transfer insertion switch 54 detects the presence of a detector or detector cable as it is inserted into the fifteen-path selector 30.

Figure 4:
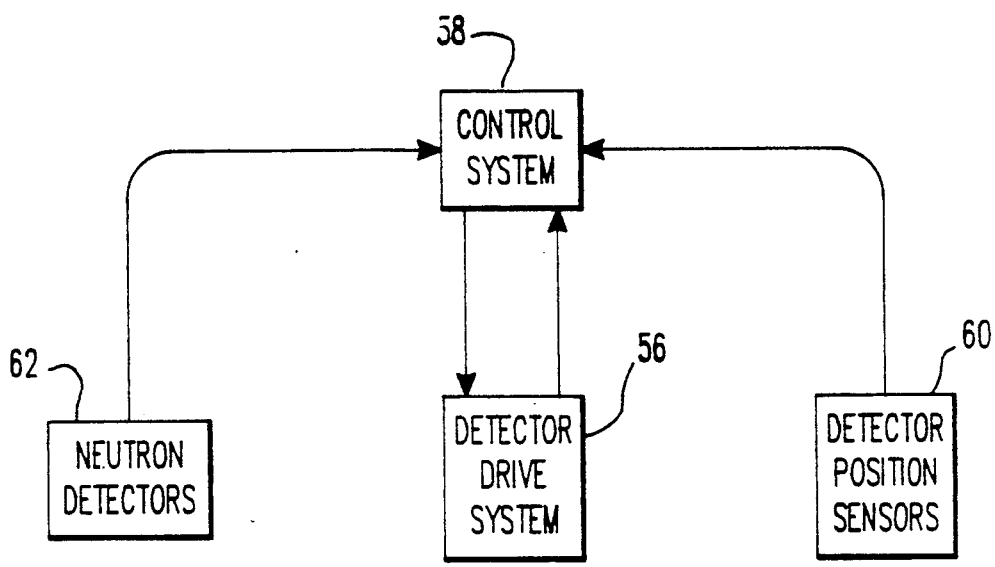
FIG. 4 is a block diagram of a flux mapping system.

A simplified block diagram of a flux mapping system is illustrated in FIG. 4. The drive system illustrated in FIGS. 2A and 2B is represented by block 56. The drive system is controlled by a control system 58 which also receives data on detector position from sensors 60 and neutron flux data from neutron detectors 62. The control system 58 executes software which operates upon the detector position data from the sensors 60 and the drive system 56 to control the drive system 56. Included in the software executed by the control system 58 is path verification software illustrated in the flowchart illustrated in FIGS. 5A and 5B. The control system 58 may be a mini- or microcomputer or, if combined with other control functions a mainframe computer. For example, an INTEL 80286-12 single board microcomputer with conventional or custom I/O boards can be used as the control system 58.

Figure 5A:
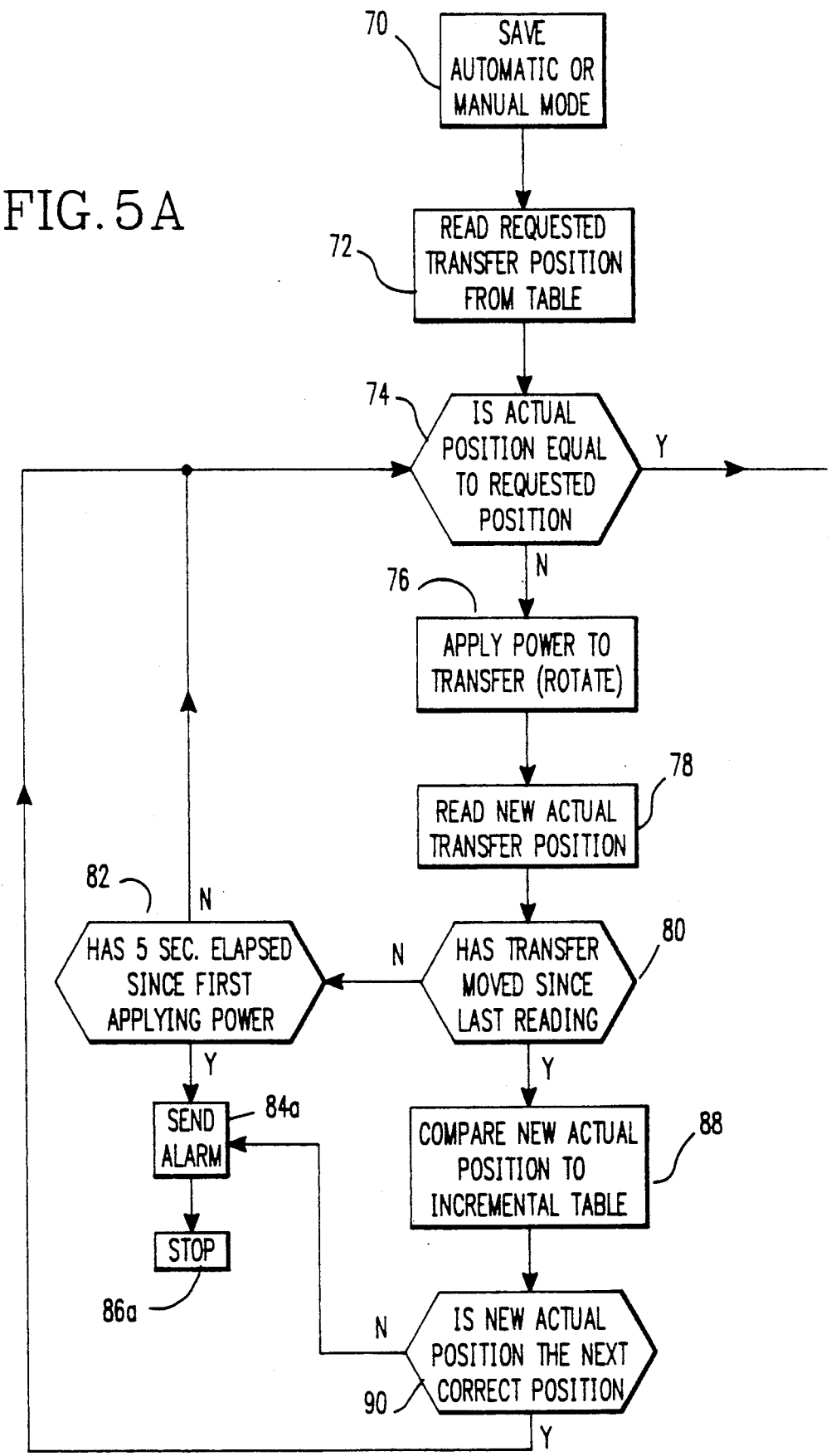
FIGS. 5A and 5B are a flowchart of software used in a path verification system according to the present invention.
Figure 5B:
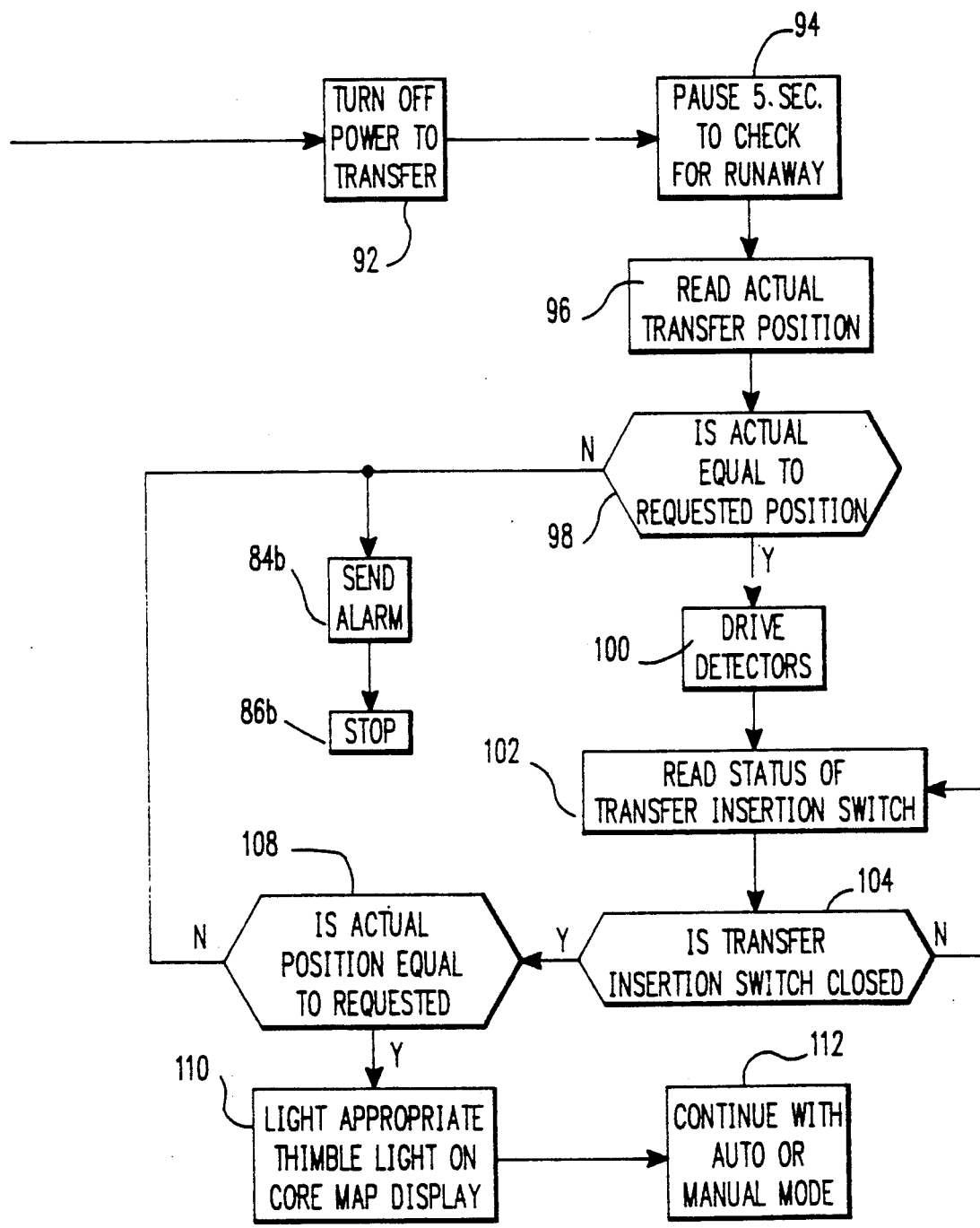

The control system 58 can operate in several different modes. As indicated in FIGS. 5A and 5B, the first step in path verification is to save 70 the mode of control being performed by the control system 58. Next, the desired position of the fifteen-path selector 30 being controlled is read 72 from a flux map table which stores the sequence of thimbles for each detector. The desired position is then compared 74 with the actual position represented by sensor readings from the position detent cams 52 in the selector 30 being controlled. Initially, the positions are likely to be unequal, so the control system 58 applies 76 power to rotate the shaft 42 thereby controlling movement of the fifteen-path selector 30.

The sensor readings from the position detent cams 52 are again read 78 and the position represented is compared 80 with the actual position that was compared to the desired position in step 74. If no movement is detected, the amount of time which has elapsed since the previous position was first detected is compared 82 with a predetermined amount of time, such as five seconds. If no indication of movement of the shaft 42 in the selector 30 is received for five seconds, an alarm state is entered 84 and the path verification processing ends 86.

If movement of the shaft 42 is detected by the comparison in step 80, the new actual position is compared 88 with the position in the Grey code table following the position which was compared to the desired position in step 74. If the positions compared in step 88 are different 90, the alarm state 84 is entered and path verification ends 86. If the actual position is the correct next position, the new actual position is compared 74 with the desired position.

When the desired position is reached, the selector 30 being controlled is instructed to stop, i.e., the power to the fifteen-path selector (transfer) 30 is turned off 92. After another predetermined period of time, e.g., five seconds, has passed 94, the actual position is read 96 from the position detent cams 52. The actual position read in step 96 is compared 98 with the desired position to verify that runaway has not occurred, i.e., the selector 30 has not continued to turn after the desired position was reached. If it is determined that runaway occurred, an alarm state is indicated 84 and path verification stops 86. If runaway does not occur, the detector driver 24 which will be used to drive a detector through the selector 30 is started 100.

When an indication is received 102 from the transfer insertion switch 54, the control system 58 determines 104 that the transfer insertion switch 54 is closed and the actual position of the selector 30 is again compared 108 to the desired position. If it is determined in step 108 that the selector has moved to another position after the five second pause 94, an alarm state is again indicated 84 and the path verification process stopped 86. On the other hand, if the actual and desired positions are equal, the control system 58 displays 110 an indication of the thimble guide being entered by the detector and the control system 58 is returned 112 to the mode of operation saved in step 70.

The many features and advantages of the present invention are apparent from the detailed specification, and thus it is intended by the appended claims to cover all such features and advantages of the system which fall within the true spirit and scope of the invention. Further, since numerous modification and changes will readily occur to those skilled in the art from the disclosure of this invention, it is not desired to limit the invention to the exact construction and operation illustrated and described. For example, any set of unique position codes could be stored as the predetermined sequence of positions instead of using a Grey code table. Accordingly, suitable modifications and equivalents may be resorted to, all falling within the scope and spirit of the invention.

What is claimed is:

1. A method for verifying position of a cable passing through a multiple-path selector, comprising the steps of:
   (a) controlling movement of the multiple-path selector to a desired position, comprising the steps of:
      (a1) receiving sensor readings of an actual position of the multiple-path selector;
      (a2) comparing the sensor readings of the actual position of the multiple-path selector with the desired position;

(a3) controlling movement of the multiple-path selector if said comparing in step (a2) determines that the actual position is unequal to the desired position;

(a4) repeating steps (a1)–(a3) until said comparing in step (a2) determines that the actual position of the multiple-path selector is equal to the desired position; and (a5) instructing the multiple-path selector to stop when said comparing in step (a2) determines that the actual position of the multiple-path selector is equal to the desired position;

(b) detecting passage of a first predetermined period of time after performing step (a5);

(c) verifying that the multiple path selector stopped at the desired position by repeating steps (a1) and (a2) after step (b) is performed;

(d) controlling insertion of the cable through the multiple-path selector after said verifying in step (c);

(e) detecting insertion of the cable into the multiple-path selector;

(f) verifying that the multiple-path selector is stopped at the desired position by repeating steps (a1) and (a2) after step (e) is performed; and (g) preventing said inserting in step (d) if said verifying performed in either of steps (c) and (f) determines that the actual and desired positions are unequal.

2. A method as recited in claim 1, wherein step (a3) comprises the steps of:

(a3A) instructing the multiple-path selector to move to a different position;

(a3B) saving the sensor readings most recently received as old sensor readings;

(a3C) receiving new sensor readings indicating the actual position of the multiple-path selector;

(a3D) comparing the new and old sensor readings of the actual position;

(a3E) repeating steps (a3C) and (a3D) until said comparing determines that the new and old sensor readings of the actual position are different;

(a3F) stopping step (a3E) and performing step (g) if said comparing in step (a3D) does not determine that the new and old sensor readings are different within a second predetermined time after performing said saving in step (a3B); and (a3G) repeating steps (a3A)–(a3F) until step (a5) is performed.

3. A method as recited in claim 2, wherein step (a3) further comprises the steps of:

(a3H) verifying that the old and new sensor readings o the actual position follow a predetermined sequence of sensor readings; and (a3I) performing step (g) if said verifying in step (a3H) is unsuccessful.

4. A method as recited in claim 3, wherein the second predetermined sequence is a Grey code sequence.

5. A method for verifying position of a cable passing through a multiple-path selector, comprising the steps of:

(a) controlling movement of the multiple-path selector to a desired position;

(b) verifying that the multiple-path selector is stopped at the desired position;

(c) controlling insertion of the cable through the multiple-path selector after said verifying in step (b); and (d) detecting insertion of the cable into the multiple-path selector; and (e) avoiding detection of the cable along a path selected by the multiple-path selector.

6. An apparatus for verifying position of a cable passing through a multiple-path selector, comprising:

selector control means for controlling movement of the multiple path selector to a desired position;

transfer insertion means for detecting insertion of the cable into the multiple-path selector;

position sensor means for detecting an actual position of the multiple-path selector;

comparison means for comparing the actual and desired position (i) until equal, (ii) after a first predetermined period of time has passed after they are detected to be equal and (iii) after said transfer insertion means detects insertion of the cable into the multiple-path selector; and insertion control means for preventing insertion of the cable through the multiple-path selector when said comparison means determines that the actual and desired positions are unequal.

7. An apparatus as recited in claim 6, further comprising error indication means for indicating an error when at lest one of the following conditions are detected: (i) a second predetermined period of time elapses without detecting movement of the multiple-path selector when said selector control means is controlling movement of the multiple-path selector, (ii) said position sensor means detects consecutive actual positions different from a predetermined sequence of actual positions, (iii) the actual and desired positions are determined to be unequal after the first predetermined period of time has elapsed since the actual and desired positions were detected to be equal and (iv) the actual and desired positions are determined to be unequal after said transfer insertion means detects insertion of the cable into the multiple-path selector.

8. A path insertion verification system for verifying insertion via a multiple-path selector of a detector into thimbles in a flux mapping system for a pressurized water nuclear reactor, comprising:

a transfer insertion switch mounted at an input of the multiple-path selector for sensing insertion of a detector into the multiple-path selector;

a position sensor for sensing an actual position of the multiple-path selector; and a control unit, operatively connected to said transfer insertion switch and said position sensor, for controlling movement of the multiple-path selector and the detector, permitting insertion of the detector into the multiple-path selector only when the actual position detected by said position sensor equals a desired position for a predetermined period of time.

9. A path insertion verification system as recited in claim 8, wherein said control unit prevents insertion of the detector into the multiple-path selector if more than a predetermined period of time elapses between changes int eh actual position of the multiple-path selector sensed by said position sensor.

10. A path insertion verification system as recited in claim 8, wherein said control unit prevents insertion of the detector into the multiple-path selector if a change in the actual position of the multiple-path selector does not follow a predetermined sequence.

11. A path insertion verification system as recited in claim 8, wherein said control unit stops insertion of the detector into the multiple-path selector if the actual and desired position are unequal when said transfer insertion switch detects insertion of the detector into the multiple-path selector.

* * * * *